(12) United States Patent
Kashiwase

(10) Patent No.: US 8,391,220 B2
(45) Date of Patent: Mar. 5, 2013

(54) BASE STATION AND BASE STATION CONTROL METHOD

(75) Inventor: Susumu Kashiwase, Yokohama (JP)

(73) Assignee: Kyocera Corporation, Kyoto (JP)

(*) Notice: Subject to any disclaimer, the term of this patent is extended or adjusted under 35 U.S.C. 154(b) by 500 days.

(21) Appl. No.: 12/601,231

(22) PCT Filed: May 22, 2008

(86) PCT No.: PCT/JP2008/059481
§ 371 (c)(1),
(2), (4) Date: Nov. 20, 2009

(87) PCT Pub. No.: WO2008/146717
PCT Pub. Date: Dec. 4, 2008

(65) Prior Publication Data
US 2010/0172277 A1    Jul. 8, 2010

(30) Foreign Application Priority Data

May 23, 2007 (JP) ................................. 2007-137148
May 23, 2007 (JP) ................................. 2007-137154
May 23, 2007 (JP) ................................. 2007-137155

(51) Int. Cl.
*H04W 4/00* (2009.01)

(52) U.S. Cl. ..................... 370/329; 455/403; 455/422.1; 455/450

(58) Field of Classification Search .......... 370/310–350; 455/422.1–460
See application file for complete search history.

(56) References Cited

U.S. PATENT DOCUMENTS 6,396,828 B1 * 5/2002 Liu ............................... 370/352
2005/0111399 A1   5/2005 Sapienza et al.
2008/0080432 A1 * 4/2008 Lu et al. ....................... 370/335
2009/0029706 A1 * 1/2009 Prakash et al. ............... 455/436
2009/0082072 A1 * 3/2009 Ulupinar et al. ............. 455/574

FOREIGN PATENT DOCUMENTS

| JP | 2000-183921 | 6/2000 |
| JP | 2004-172772 | 6/2004 |
| WO | WO-2004/088896 | 10/2004 |

OTHER PUBLICATIONS

Connection Control Plane for Ultra Mobile Broadband (UMB) Air Interface Specification, 3GPP2 C.S0084-006-0 Version 1.0, (Apr. 2007) Ch. 5.
International Search Report for PCT/JP2008/059481, mailed Aug. 19, 2008.
SemiConnected Proposal for LBC, Source: Qualcomm and Motorola, Oct. 26, 2006.

* cited by examiner

*Primary Examiner* — Charles C Jiang
(74) *Attorney, Agent, or Firm* — Duane Morris LLP

(57) ABSTRACT

A base station is provided with an assignment unit 37 for assigning an access terminal identifier to an access terminal 21 of the base station, a memory unit for storing information to permit transition into a semi connected state where the access terminal 21 saves power, while the access terminal 21 holds the access terminal identifier, and a change unit, in a case where an access terminal among the access terminals 21 having the access terminal identifiers assigned thereto is using an application for which transition into the semi connected state is effective and an access terminal identifier assigned to the access terminal 21 is not permitted to transit into the semi connected state, for changing the access terminal identifier assigned to the access terminal 21 to an access terminal identifier permitted to transit into the semi connected state based on the information stored by the memory unit 46.

3 Claims, 13 Drawing Sheets

FIG. 6

| MAC-ID | SEMI CONNECTED PERMISSION FLAG |
|---|---|
| 0 (00 0000 0000) | 0 |
| ~ | ~ |
| 199 (00 1100 0111) | 0 |
| 200 (00 1100 1000) | 1 |
| ~ | ~ |
| 250 (00 1111 1010) | 1 |
| 251 (00 1111 1011) | 0 |
| ~ | ~ |
| 1023 (11 1111 1111) | 0 |

} FIXED RANGE OF MAC-ID (51) TO WHICH SEMI CONNECTED IS PERMITTED

FIG. 13

| MAC-ID | SEMI CONNECTED PERMISSION FLAG |
|---|---|
| 0 (00 0000 0000) | f(0) |
| 1 (00 0011 0010) | f(1) |
| ~ | ~ |
| 50 (00 0000 0000) | f(50) |
| 51 (00 0011 0010) | f(51) |
| 52 (00 0011 0011) | f(52) |
| 53 (00 0011 0100) | f(53) |
| 54 (00 011 0101) | f(54) |
| 55 (00 0011 0101) | f(55) |
| 56 (00 0011 0110) | f(56) |
| ~ | ~ |
| 1023 (11 1111 1111) | f(1023) |

WHEN N MAC-ID = 1024 f(x) = 1 or 0, x = 0 to 1023, a total number of 1 is less or equal to N Semi Connected Permit RND = a random number from 0 to 1

IF RND < (N Semi Conneted Permit)/(N MAC-ID) then f(x)=1 else f(x)=1

BASE STATION AND BASE STATION CONTROL METHOD

CROSS-REFERENCE TO RELATED APPLICATIONS

This is a US National Phase Application of International Application No. PCT/JP2008/059481 filed May 22, 2008, which claims priority to Japanese Patent Applications Nos. 2007-137155 filed May 23, 2007, 2007-137148 filed May 23, 2007, and 2007-137154 filed May 23, 2007, the disclosures of which are incorporated herein by reference in their entirety.

TECHNICAL FIELD

The present invention relates to base stations and control methods of the base stations in relation to a semi connected state adopted by CDMA2000 Evolution (Ultra Mobile Broadband: UMB).

BACKGROUND ART

A semi connected operation is known as a function implemented on an upper layer of CDMA2000 series advanced by use of technologies such as an OFDM (Orthogonal Frequency Division Multiple Access) and the likes.

In the semi connected operation, for the purpose of power saving, a semi connected state is provided in which, although a MAC-ID (Media Access Control Identifier) is assigned, a reverse link (RL) is not transmitting, while an assigned part of a forward link (FL) continues receiving. Since it is possible to transit from the semi connected state to an open state by providing the semi connected state, it achieves faster transition than transition from an idle state to the open state.

The semi connected state is adopted by CDMA2000 Air Interface Evolution (Loosely Backwards Compatible: LBC) (see Non-Patent Document 1) and effective when used at reception of PPT (Push To Talk). For example, two or more terminals (Access Terminal: AT) are dealt as a group for PTT in a cellular system (Push To Talk On Cellular: PoC) and are placed in a standby state (idle state) or a reception state simultaneously.

More specifically, two or more terminals are grouped and, when one terminal in the group is calling, other terminals are set in the reception state, so as to be used for a purpose of dispatch operation group call or the likes. In this operation style, the terminals are only receiving most of the time. That is, minimization of transmission on the reverse link contributes to a reduction in power consumption. Such scheme for reducing power consumption of a terminal is disclosed in "WIRELESS COMMUNICATION SYSTEM" (Patent Document 1), for example.

Incidentally, transition from a standby state to a call state takes time as it requires to path through an access state and obtain MAC-ID. Since paging is monitored at paging monitor intervals (normally set at between 1 to 10 seconds), it delays start of a call. Therefore, it is not possible to avoid breaking up of a beginning part of the call.

On the other hand, the semi connected state enables reception of a common channel on the forward link from the base station at any time. That is, information on assignment of the forward link sent in each frame (normally, 5 to 500 ms) is continuously monitored. In the semi connected state where a terminal can return to the open state quickly and "there is less breaking up of the beginning part of the call", the terminal does not consume a resource of a traffic channel while holding MAC-ID assigned thereto.

In the semi connected state, the access terminal operates as follows:
(1) In a power saving state
(2) No transmission on the reverse link (transmission of a reverse control channel)
(3) Holding MAC-ID
(4) Periodically monitoring assignment information of the reverse link or the forward link (F-SCCH: Forward Shared Control Channel)

The semi connected state is canceled by access (Access Attempt) for transmission on the reverse link, that is, when the terminal transits into the open state.

Patent Document 1: Japanese Patent Application Laid-Open No. 2004-172772
Non-Patent Document 1: 3GPP2 TSG-CC21-20061030-009R2-Qualcomm_Semi Connected_Mode.pdf

SUMMARY OF INVENTION

Technical Problem

However, in the semi connected state, since the terminal performs only reception with holding an assigned MAC-ID, which is a value between 5 to 11 bits assigned to each sector on an air interface, it may cause a lack of MAC-ID. That is, when a number of terminals disorderly enter the semi connected state in the same sector, it may occur that the base station cannot permit a user (terminal) in need of entering the semi connected state because of a lack of MAC-ID or that the terminal cannot start communication newly because of the lack of MAC-ID although there are available traffic channels.

Without an appropriate selection of MAC-ID to permit transition into the semi connected state in order to avoid such conditions, it may occur that the user in need of the semi connected state cannot be permitted to enter the semi connected state.

It is an object of the present invention to provide a base station and a control method of the base station that are capable of permitting a user in need of the semi connected state to enter the semi connected state by appropriately selecting MAC-ID to be permitted to be in the semi connected state.

Solution to Problem

In order to achieve the above object, a base station in accordance with the present invention includes: an assignment unit for assigning an access terminal identifier to an access terminal of the base station so as to identify access terminals that the base station controls; a memory unit for storing information to permit transition into a semi connected state where an access terminal saves power, while the access terminal holds an access terminal identifier; and a change unit, in a case where an access terminal among the access terminals having the access terminal identifiers assigned thereto uses an application for which transition into the semi connected state is effective and an access terminal identifier assigned to the access terminal is not permitted to transit into the semi connected state, for changing the access terminal identifier assigned to the access terminal to an access terminal identifier permitted to transit into the semi connected state based on the information stored in the memory unit.

The base station in accordance with one embodiment of the present invention preferably includes a transmission unit for transmitting the information to permit the transition into the semi connected state stored in the memory unit to the access terminal.

In addition, as to the base station in accordance with another embodiment of the present invention, it is preferred that the change unit detects that the access terminal is using the application for which transition into the semi connected state is effective when the access terminal requests the transition into the semi connected state.

A base station in accordance with the present invention includes: an assignment unit for assigning an access terminal identifier to an access terminal of the base station so as to identify access terminals that the base station controls; a generation unit for generating information to permit transition into a semi connected state where an access terminal saves power, while the access terminal holds an access terminal identifier; a transmission unit for transmitting the information to permit the transition into the semi connected state generated by the generation unit to the access terminal; a monitor unit for monitoring an operation period of an application being used by an access terminal among the access terminals having the access terminal identifiers assigned thereto, wherein transition into the semi connected state is effective for the application; and a change unit, in a case where the application is used by the access terminal for a predetermined period or longer based on a result of a monitor by the monitor unit and an access terminal identifier assigned to the access terminal is not permitted to transit into the semi connected state, for changing the information generated by the generation unit so as to permit the access terminal to transit into the semi connected state.

A base station in accordance with the present invention includes: an assignment unit for assigning an access terminal identifier to an access terminal of the base station so as to identify access terminals that the base station controls; a generation unit for generating information to permit transition into a semi connected state where an access terminal saves power, while the access terminal holds an access terminal identifier; a transmission unit for transmitting the information to permit the transition into the semi connected state generated by the generation unit to the access terminal; a request unit for requesting attribute information of the access terminal to the access terminal having the access terminal identifier assigned thereto; an obtainment unit for obtaining a response with regard to the attribute information of the access terminal from the access terminal in response to a request by the request unit; and a change unit, based on the attribute information of the access terminal obtained from the access terminal by the obtainment unit, for changing the information to permit the transition into the semi connected state generated by the generation unit.

In addition, as to the base station in accordance with one embodiment of the present invention, it is preferred that the attribute information of the access terminal indicates priority of the access terminal and the change unit changes the information to permit the transition into the semi connected state in accordance with priority of the access terminal.

In addition, a control method of a base station in accordance with the present invention includes: an assignment step for assigning an access terminal identifier to an access terminal of the base station so as to identify access terminals that the base station controls; a storage step for storing information to permit transition into a semi connected state where an access terminal saves power, while the access terminal holds an access terminal identifier; and a change step, in a case where an access terminal among the access terminals having the access terminal identifiers assigned thereto uses an application for which transition into the semi connected state is effective and an access terminal identifier assigned to the access terminal is not permitted to transit into the semi connected state, for changing the access terminal identifier assigned to the access terminal to an access terminal identifier permitted to transit into the semi connected state based on the information stored.

Moreover, a control method of a base station in accordance with the present invention includes: an assignment step for assigning an access terminal identifier to an access terminal of the base station so as to identify access terminals that the base station controls; a generation step for generating information to permit transition into a semi connected state where an access terminal saves power, while the access terminal holds an access terminal identifier; a transmission step for transmitting the information to permit the transition into the semi connected state generated to the access terminal; a monitor step for monitoring an operation period of an application being used by an access terminal among the access terminals having the access terminal identifiers assigned thereto, wherein transition into the semi connected state is effective for the application; and a change step, in a case where the application is used by the access terminal for a predetermined period or longer based on a result of a monitor and an access terminal identifier assigned to the access terminal is not permitted to transit into the semi connected state, for changing the information generated so as to permit the access terminal to transit into the semi connected state.

Furthermore, a control method of a base station in accordance with the present invention includes: an assignment step for assigning an access terminal identifier to an access terminal of the base station so as to identify access terminals that the base station controls; a generation step for generating information to permit transition into a semi connected state where an access terminal saves power, while the access terminal holds an access terminal identifier; a transmission step for transmitting the information to permit the transition into the semi connected state generated to the access terminal; a request step for requesting attribute information of the access terminal to the access terminal having the access terminal identifier assigned thereto; an obtainment step for obtaining a response with regard to the attribute information of the access terminal in response to the request; and a change step, based on the attribute information of the access terminal obtained from the access terminal in the obtainment step, for changing the information to permit the transition into the semi connected state generated.

Advantageous Effects on Invention

According to the present invention, since MAC-ID to be permitted to transit into the semi connected state is selected appropriately, it is possible to permit a user in need of being in the semi connected state to transit into the semi connected state.

BRIEF DESCRIPTION OF DRAWINGS

FIG. 6 is a table exemplifying correspondence of access terminal identifiers and semi connected state permission flags;

FIG. 13 is a table exemplifying correspondence of access terminal identifiers and semi connected state permission flags in accordance with a fifth embodiment.

Figure 1:
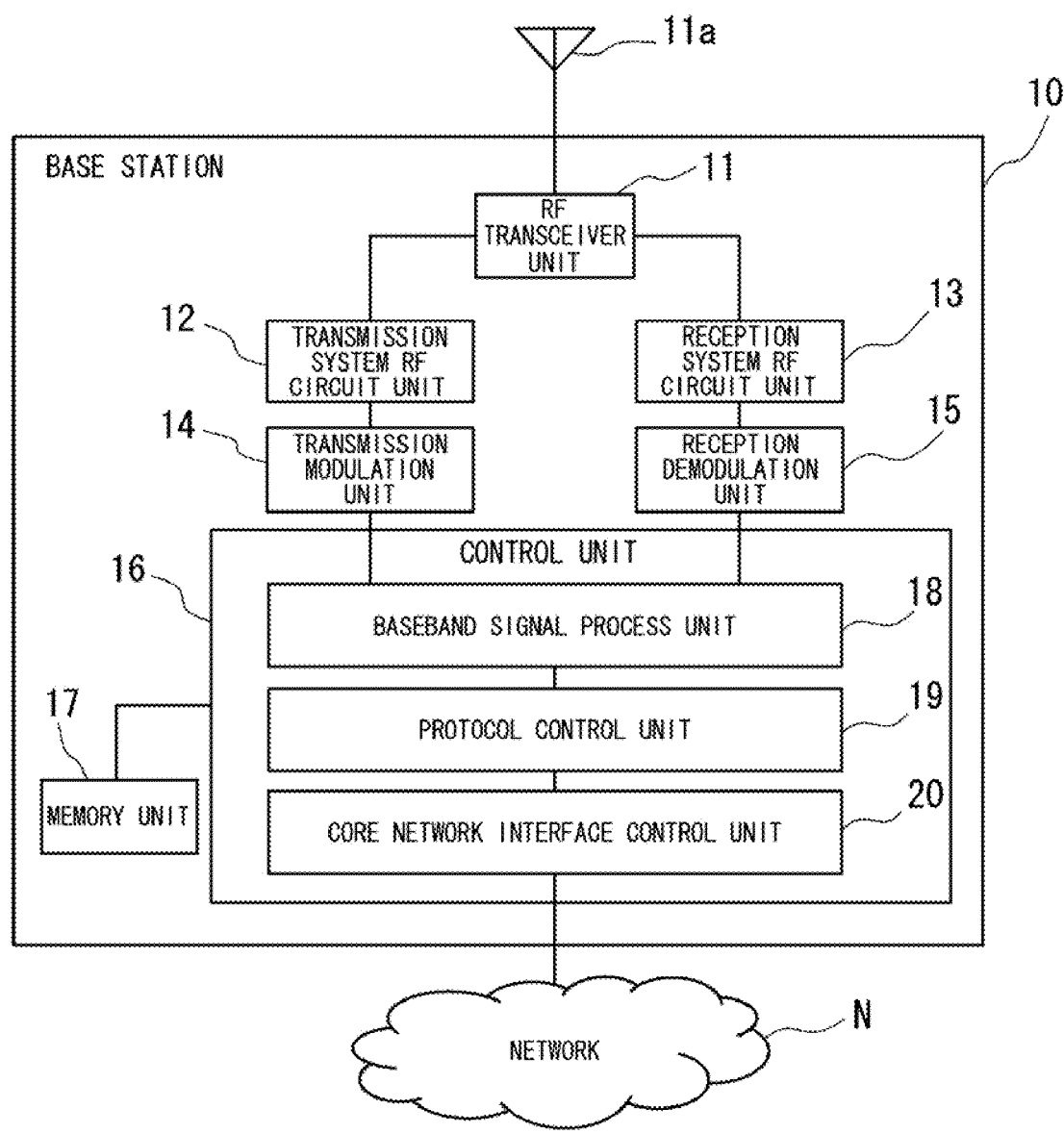
FIG. 1 is a block diagram illustrating a constitution of a base station in accordance with a first embodiment of the present invention.

REFERENCE SIGNS LIST 10 base station
11a, 22a antenna
11, 22 RF transceiver unit
12, 23 transmission system RF circuit unit
13, 24 reception system RF circuit unit
14, 25 transmission modulation unit
15, 26 reception demodulation unit
16, 27 control unit
17, 28 memory unit
18, 29 baseband signal process unit
19, 30 protocol control unit
20 core network interface control unit
21 access terminal
31 man machine interface control unit
32 display unit
33 input apparatus
34a, 34b speaker
35 microphone
36, 42, 45 access terminal control unit
37 assignment unit
38 generation unit
39 request unit
40 obtainment unit
41, 44, 47 change unit
43 monitor unit
46 memory unit
N core network

DESCRIPTION OF EMBODIMENTS

Preferred embodiments of the present invention will be described with reference to the accompanying drawings.

First Embodiment

FIG. 1 is a block diagram illustrating a constitution of a base station in accordance with a first embodiment of the present invention. As shown in FIG. 1, a base station 10 is provided with an RF transceiver unit 11 for transmitting and receiving a signal via an antenna 11a with an access terminal 21 (see FIG. 3), which is a wireless communication terminal apparatus such as a cellular phone or the like, for example, and will be describe below, a transmission system RF circuit unit 12 and a reception system RF circuit unit 13 connected to the RF transceiver unit 11, a transmission modulation unit 14 connected to the transmission system RF circuit unit 12, a reception demodulation unit 15 connected to the reception system RF circuit unit 13, a control unit 16 connected to the transmission modulation unit 14 and the reception demodulation unit 15 and for controlling operations of the base station 10, and a memory unit 17 connected to the control unit 16.

The control unit 16 is provided with a baseband signal process unit 18, a protocol control unit 19 and a core network interface control unit 20. The core network interface control unit 20 is connected to a core network N of a mobile communication network or the likes.

It is to be noted that the "base station" described in the present embodiment includes a "sector", which is one of a plurality of sections dividing a cell, which is a communication area of the base station. The descriptions about the "base station" are applicable to the "sector" as well, hereinafter.

In cooperation with each unit stated above as necessary, the control unit 16 determines a state of the base station 10 based on an occupied amount of the base station 10 or of the sector, and functions as a transmission unit for transmitting information (Semi Connected Permit MAC-ID List) to permit transition into a semi connected state to the access terminal 21.

In cooperation with each unit stated above as necessary, the control unit 16 also functions as a reception unit for receiving a transition request (Semi Connected start Request) from the access terminal 21 to transit into the semi connected state where the access terminal 21 saves power (power saving state) while holding an access terminal identifier (MAC-ID) that the base station 10 has assigned to identify the access terminal 21. In addition, the control unit 16 determines the state of the base station 10 in response to the transition request, and functions as a transmission unit, when it is not possible to permit the transition request into the semi connected state as a result of a determination on the state of the base station 10, for transmitting a response (Semi Connected start Reject) with a reason for not permitting (Rejection Reason) to the transition request to the access terminal 21.

The state of the base station 10 is determined based on whether the base station 10 supports a function to have the access terminal 21 transit into the semi connected state, and the state of the base station 10 or a state of the sector is determined based on the capacities thereof. In a case where the base station 10 or the sector does not support the function to have the access terminal 21 transit into the semi connected state, the transmission unit transmits the response with a reason that the base station 10 or the sector does not support the function to the access terminal 21 to the transition request. In a case where an occupied amount of the base station 10 or of the sector exceeds a predetermined value, the transmission unit transmits the response with a reason that the occupied amount of the base station 10 or of the sector exceeds the predetermined value to the access terminal 21 to the transition request.

The occupied amount of the base station 10 or of the sector is based on the number of used access terminal identifiers (for example, MAC-ID) that the base station 10 or the sector has assigned to identify the access terminal 21 or the number of remained access terminal identifiers. And the occupied amount is also based on the number of communication channels remained or assigned to the access terminal 21 by the base station 10 or the sector.

Figure 2:
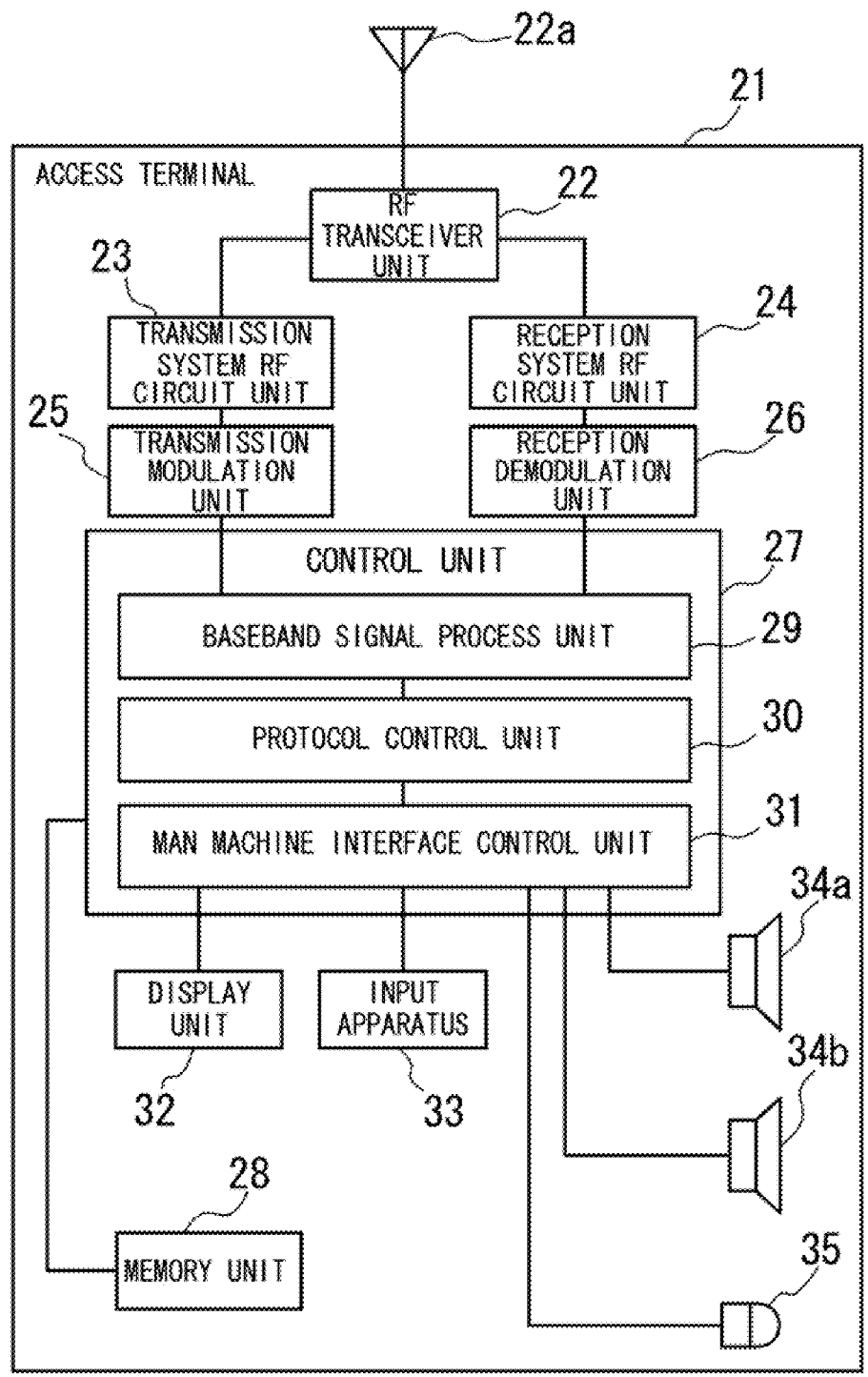
FIG. 2 is a block diagram illustrating a constitution of an access terminal accordance with the first embodiment of the present invention.

FIG. 2 is a block diagram illustrating a constitution of the access terminal in accordance with the first embodiment of the present invention. As shown in FIG. 2, the access terminal 21 is provided with an RF transceiver unit 22 for transmitting and receiving a signal with the base station 10 (see FIG. 1) via an antenna 22a, a transmission system RF circuit unit 23 and a reception system RF circuit unit 24 connected to the RF transceiver unit 22, a transmission modulator unit 25 connected to the transmission system RF circuit unit 23, a reception demodulator unit 26 connected to the reception system RF circuit unit 24, a control unit 27 to which the transmission modulator unit 25 and the reception demodulator unit 26 are connected, and a memory unit 28 connected to the control unit 27.

The control unit 27 is provided with a baseband signal process unit 29, a protocol control unit 30 and a man machine interface control unit 31.

Connected to the man machine interface control unit 31 are a display unit 32 such as an LCD (Liquid Crystal Display) and the likes, an input apparatus 33 such as a keyboard and the likes for inputting information, speakers 34a, 34b, and a microphone 35.

In cooperation with each unit stated above as necessary, the control unit 27 functions as the reception unit for receiving the information (Semi Connected Permit MAC-ID List) to permit the transition into the semi connected state where the access terminal 21 saves power (power saving state) while holding the access terminal identifier (MAC-ID) from the base station 10.

Also, the control unit 27, when determining to transit into the semi connected state, functions as a transmission unit for transmitting a request (Semi Connected Start) to transit into the semi connected state to the base station 10 based on the information (Semi Connected Permit MAC-ID List) to permit the transition into the semi connected state received and the access terminal identifier (MAC-ID) assigned to the self-terminal.

In cooperation with each unit stated above as necessary, the control unit 27 functions as a transmission unit for transmitting the transition request to transit into the semi connected state where the access terminal 21 saves power while holding the access terminal identifier that the base station 10 has assigned to identify the access terminal 21 to the base station 10, functions as a reception unit for receiving the response to the transition request from the base station 10, and when the response received indicates that the request to transit into the semi connected state is not permitted, functions as a control unit for controlling retransmission of the transition request, based on the rejection reason attached to the response.

In the semi connected state described above, the access terminal 21 performs as follows:
(1) In a power saving state
(2) No transmission on the reverse link (no transmission of a reverse control channel)
(3) Holding MAC-ID
(4) Periodically monitoring assignment information of the reverse link or the forward link (F-SCCH: Forward Shared Control Channel)

The semi connected state is canceled when an access (Access Attempt) is performed for a transmission on the reverse link, that is, when the access terminal transits into an open state.

When the rejection reason attached to the response indicates that the base station 10 or the sector does not support the function to have the access terminal 21 transit into the semi connected state, the control unit does not retransmit the transition request but, if the access terminal 21 performs hand off to another base station 10 or another sector, controls to newly transmit the transition request to the another base station 10 or the sector. When the rejection reason attached to the response indicates that the occupied amount in the base station 10 or of the sector exceeds the predetermined value, the control unit controls to retransmit the transition request to the base station 10 after a predetermined period of time.

In order to address a lack of access terminal identifiers (MAC-ID) in a particular sector, the number of terminals (access terminals 21) to transit into a semi connected mode is limited.

In order to limit the number of access terminals 21 to transit into the semi connected mode, the access terminal identifiers of the access terminals 21 permitted to enter the semi connected state are limited.

First, the base station 10 expands an "access parameter" message. Thereby, the access terminal 21 is informed of a list of the access terminal identifier (MAC-ID) permitted to enter the semi connected state in advance.

The access terminal 21 enters an idle state based on content of the "access parameter" message. The access terminal identifier is assigned to the access terminal 21 when the access terminal 21 transits from the idle state into the open state. In a case where the access terminal identifier of the access terminal 21 is listed in the Semi Connected Permit MAC-ID List, the access terminal 21 transmits a transition request (Semi Connected Start) message to transit into the semi connected state while being in the open state.

That is, the base station 10 is capable of limiting the number of access terminals 21 to enter the semi connected state by itself, and the access terminal 21 is capable of knowing in advance whether it is to be rejected or not to enter the semi connected state by comparing the access terminal identifier (MAC-ID) of the self-terminal to the Semi Connected Permit MAC-ID List. Therefore, the base station 10 is capable of limiting the number of access terminals 21 to enter the semi connected state per base station (or sector).

Next comes descriptions of methods for controlling the base station 10 and the access terminal 21.

Figure 3:
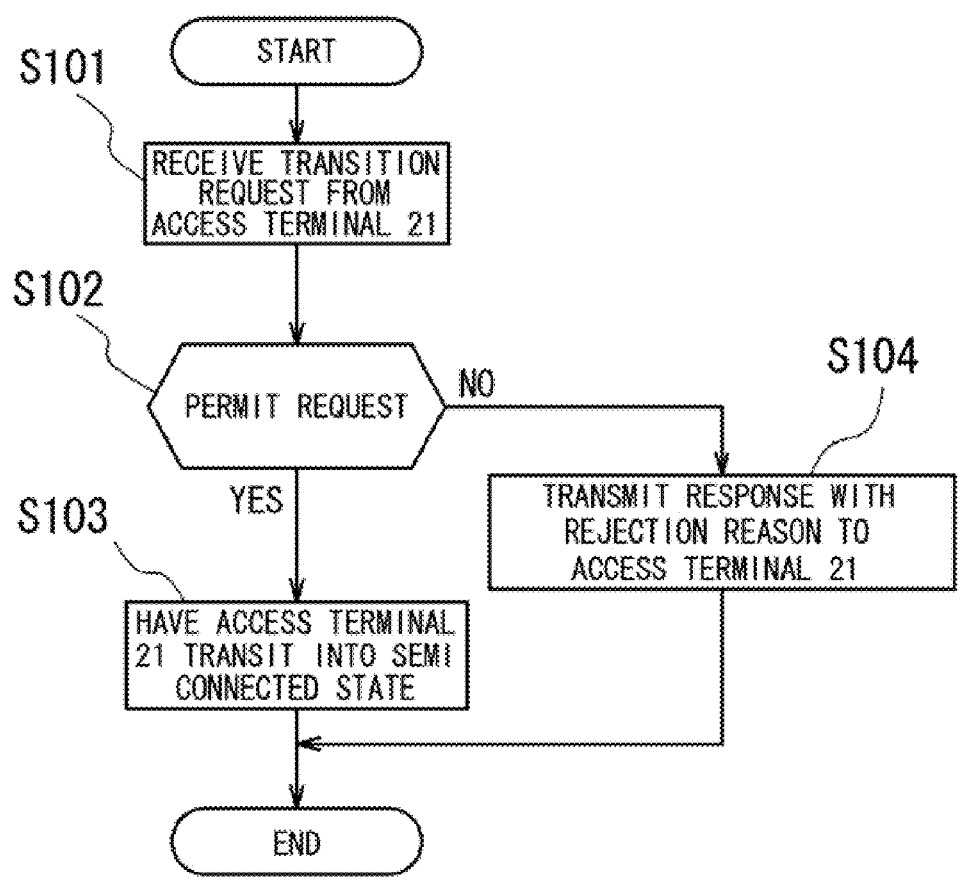
FIG. 3 is a flow chart of a control process of the base station.

FIG. 3 is a flow chart of a control process of the base station. First, as shown in FIG. 3, the base station 10 receives a transition request into the semi connected state where the access terminal 21 saves power from the access terminal 21 (S101). At this time, the access terminal 21 is still holding an access terminal identifier (MAC-ID) that the base station 10 has assigned to identify the access terminal 21.

Then, the base station 10 determines the state of the base station 10 or of the sector to determine whether it can permit the transition request (S102). The base station 10 or the sector determines the state thereof based on whether the base station 10 or the sector supports the function to have the access terminal 21 transit into the semi connected state, and also based on a present state of the occupied amount in the base station or in the sector.

When the base station 10 can permit (YES) the transition request into the semi connected state as a result of a determination on the state, the base station 10 has the access terminal 21 transit into the semi connected state (S103) and then ends the process. On the other hand, when the base station 10 cannot permit (NO) the transition request into the semi connected state, the base station 10 transmits a response with a rejection reason to the transition request to the access terminal 21 (S104) and then ends the process.

That is, in a case where the base station 10 or the sector does not support the function to have the access terminal 21 transit into the semi connected state, the base station 10 transmits the reason that the base station 10 or the sector does not support the function by attaching the reason to the response to the transition request. In addition, the base station 10 or the sector determines its state based on the occupied amount therein and, when the occupied amount in the base station 10 or the sector exceeds a predetermined value, transmits the reason that the occupied amount in the base station 10 or in the sector exceeds the predetermined value by attaching the reason to the response to the transition request.

Figure 4:
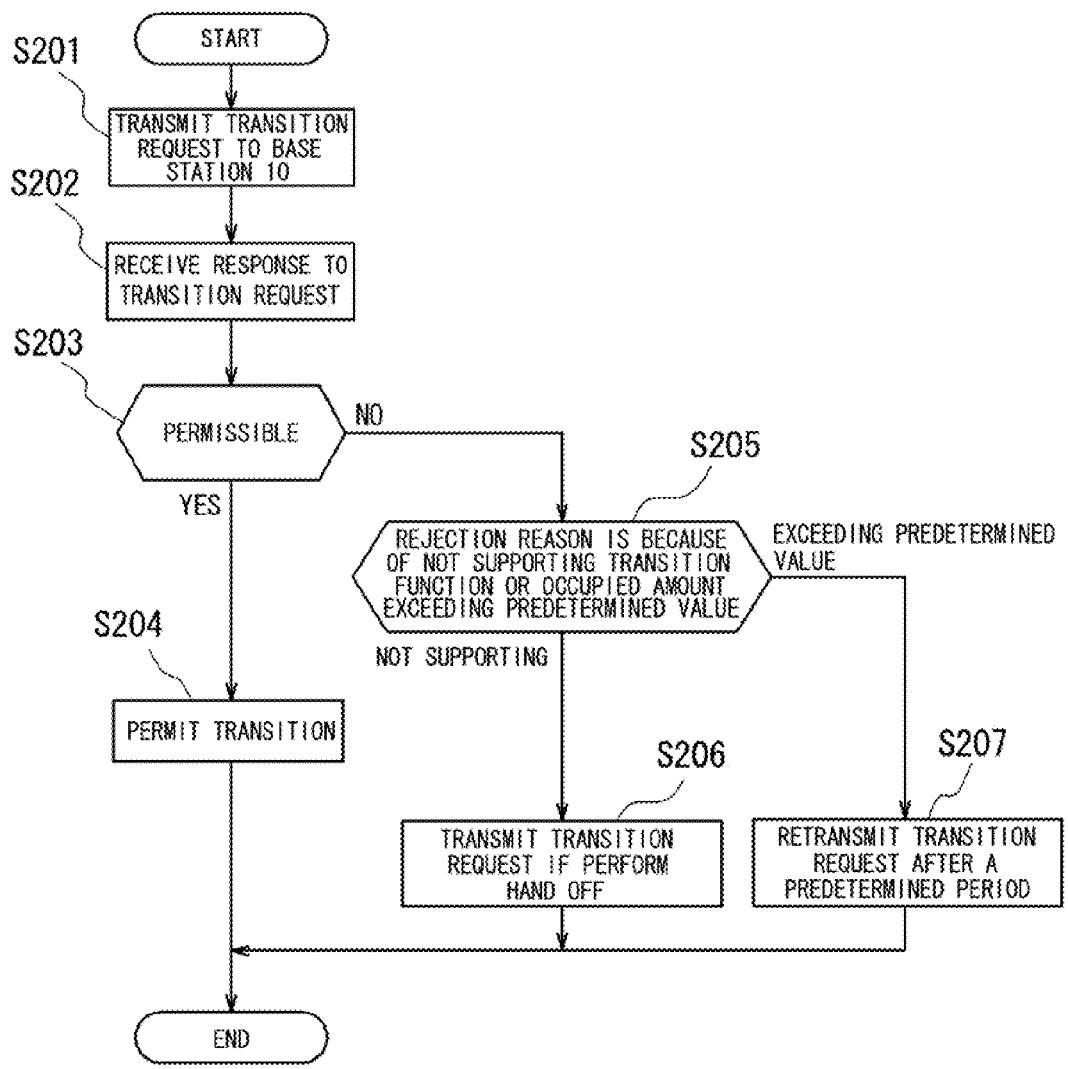
FIG. 4 is a flow chart of a control process of the access terminal.

FIG. 4 is a flow chart of a control process of the access terminal. First, as shown in FIG. 4, the access terminal 21 transmits a transition request into the semi connected state where the access terminal 21 saves power to the base station 10 (S201). At this point, the access terminal 21 is still holding the access terminal identifier (MAC-ID) that the base station 10 has assigned to identify the access terminal 21.

Next, the access terminal 21 receives a response to the transition request from the base station 10 (S202). The access terminal 21 then determines whether the response received indicates to permit the transition into the semi connected state or not (S203) and, when the response indicates that it is permitted (YES), transits into the semi connected state by permitting transition into semi connected state (S204), and then ends the process.

On the other hand, when the response indicates that it is not permitted (NO), the access terminal 21 retransmits the transition request based on the rejection reason attached to the response. At this time, the access terminal 21 determines the rejection reason attached to the response (S205). When the reason attached to the response indicates that the base station 10 or the sector does not support the function to have the access terminal 21 transit into the semi connected state, the access terminal 21 does not retransmit the transition request but, if the access terminal 21 performs hand off after waiting for hand off to another base station or another sector, newly transmits the transition request to the base station or the sector to which the access terminal 21 performs hand off (S206). When the rejection reason attached to the response indicates that the occupied amount in the base station 10 or in the sector exceeds the predetermined value, the access terminal 21 retransmits the transition request after a predetermined period of time (S207).

Figure 5:
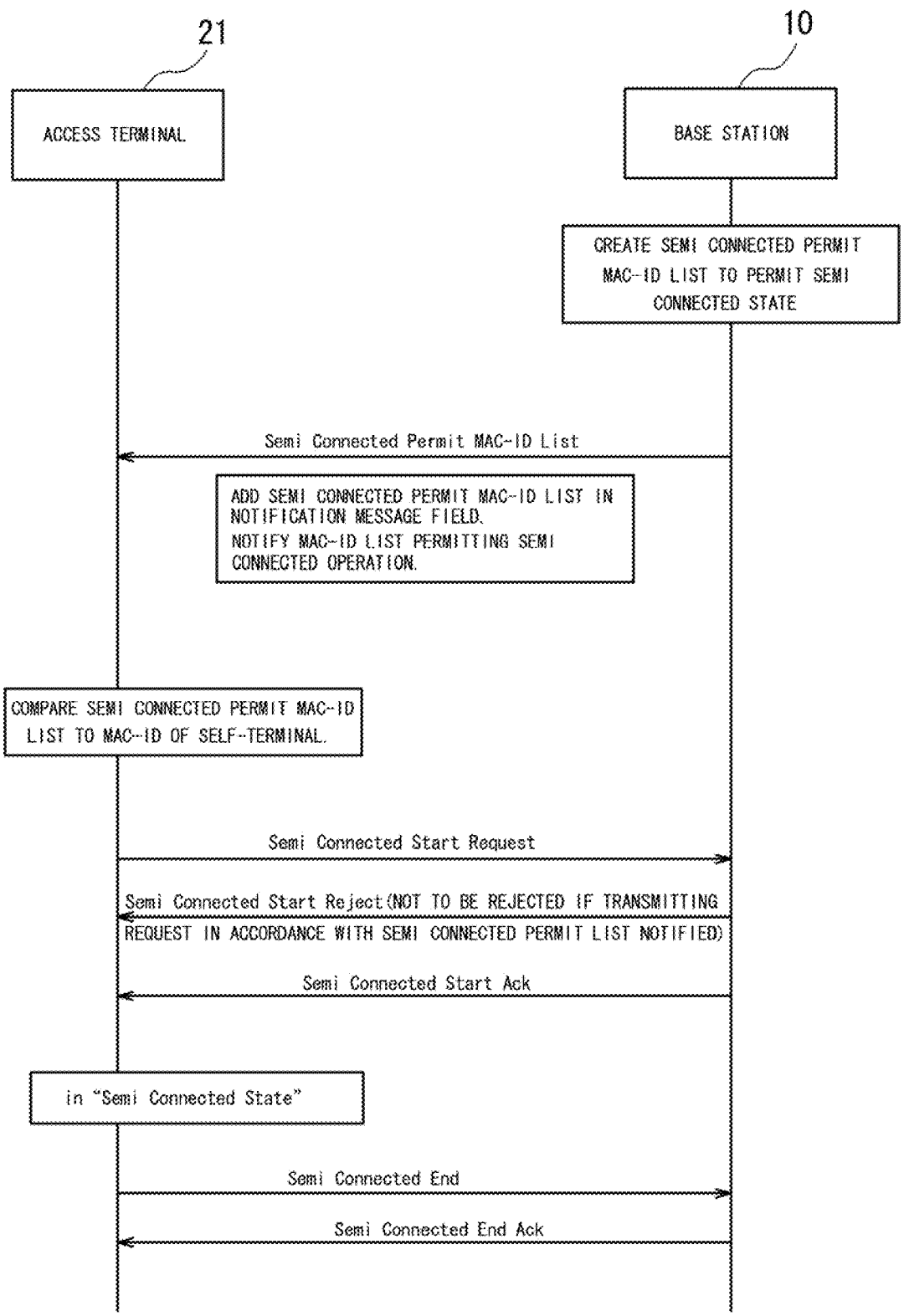
FIG. 5 is a sequence diagram illustrating exchanges of massages between the base station and the access terminal.

FIG. 5 is a sequence diagram illustrating exchanges of massages between the base station and the access terminal. A basic operation sequence with regard to the semi connected state between the base station 10 and the access terminal 21 (terminal) is described as follows.

As shown in FIG. 5, the base station 10 creates the list of the access terminal identifiers (semi Connected Permit MAC-ID List), which is information on the access terminals 21 to be permitted to transit into the semi connected state. The base station 10 and the access terminal 21 are in the open state and the base station 10 transmits the information (Semi Connected Permit MAC-ID List) to permit the transition into the semi connected state to the access terminal 21.

The base station 10 adds the Semi Connected Permit MAC-ID List in a field of a notification message to notify the access terminal 21 of the Semi Connected Permit MAC-ID List.

The access terminal 21 receives and stores the Semi Connected Permit MAC-ID List. Then, the access terminal 21 compares the access terminal identifiers in the Semi Connected Permit MAC-ID List to the access terminal identifier assigned to the access terminal 21.

FIG. 6 is a table exemplifying correspondence of the access terminal identifiers and semi connected state permission flags. As shown in FIG. 6, to the access terminal identifiers (MAC-ID) permitted to transit into the semi connected state, the semi connected permission flags are set to 1, while to the access terminal identifiers (MAC-ID) not permitted to transit into the semi connected state, the semi connected state permission flags are set to zero.

In the example shown in FIG. 6, the access terminal identifiers for the base station 10 to permit the access terminal 21 to transit into the semi connected state are in a fixed range predetermined and the number of access terminal identifiers (200 to 250, that is, 51) permitted to transit into the semi connected state is 51.

Since the number of access terminal identifiers (MAC-ID) permitted to enter the semi connected state is fixed, in order to make the access terminal 21 to which MAC-ID not permitted to transit into the semi connected state is assigned perform an operation of the semi connected state, an assignment operation of MAC-ID permitted is performed to the access terminal 21. Such operation may be carried out by execution of handoff within the same sector.

Now back to the description of FIG. 5. Next, the access terminal 21 starts an application which requires the semi connected state. After start of the application, if there is no data to transmit for a predetermined period and the semi connected state permission flag corresponding to the access terminal identifier (MAC-ID), which is a code indicated in the Semi Connected Permit MAC-ID List, is 1, the access terminal 21 transmits a semi connected start request to the base station 10.

After receiving the semi connected start request, the base station 10 transmits a semi connected response of a Semi Connected Start Reject or a Semi Connected Start Ack to the access terminal 21. If the access terminal 21 transmits the semi connected start request in accordance with the Semi Connected Permit MAC-ID List notified by the base station 10, the Semi Connected Start is not rejected, which may prevent a vain transmission.

When the semi connected response from the base station 10 is the Semi Connected Start Ack, the access terminal 21 and the base station 10 shift to the semi connected operation. Then, in order for the access terminal 21 to leave the semi connected state, the access terminal 21 transmits a Semi Connected End to the base station 10, in response to which the base station 10 transmits a Semi Connected End Ack to the access terminal 21, and then the access terminal 21 leaves the semi connected state.

On the other hand, when the semi connected response from the base station 10 is the Semi Connected Start Reject, the access terminal 21 and the base station 10 operate in accordance with the rejection reason described above.

Next, other embodiments of methods for generating the information (Semi Connected Permit MAC-ID List) to permit the semi connected state are described.

Second Embodiment

In a second embodiment, based on the attribute information of the access terminal 21, the base station 10 responds by changing the information (Semi Connected Permit MAC-ID List) to permit the transition into the semi connected state.

Figure 7:
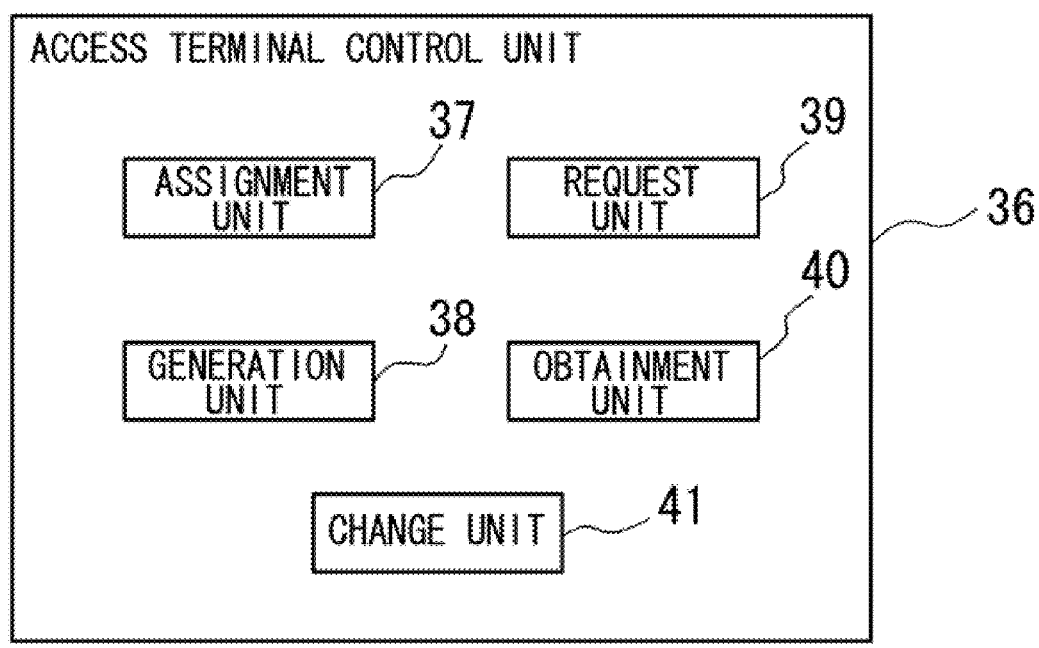
FIG. 7 is a block diagram illustrating a constitution of an access terminal control unit provided to a control unit in FIG. 1 in accordance with a second embodiment.

FIG. 7 is a block diagram illustrating a constitution of an access terminal control unit provided to the control unit in FIG. 1 in accordance with a second embodiment. In the control unit 16 of the base station 10, the protocol control unit 19, for example, is provided with an access terminal control unit 36 for controlling the access terminal 21 and, as shown in FIG. 7, the access terminal control unit 36 is provided with an assignment unit 37, a generation unit 38, a request unit 39, an obtainment unit 40 and a change unit 41.

The assignment unit 37 assigns the access terminal identifier (MAC-ID), which is for identifying the access terminal 21 to be controlled by the self-station (base station), to the access terminal 21 which is a target of the self-station to control. The generation unit 38 generates the information (Semi Connected Permit MAC-ID List) to permit the transition into the semi connected state where the access terminal 21, the target of the self-station to control, saves power with holding the access terminal identifier. The information to permit the transition into the semi connected state generated by the generation unit 38 is transmitted to the access terminal 21 by control of the control unit (transmission unit) 16.

The request unit 39 requests the attribute information of the access terminal 21 to the access terminal 21 having the access terminal identifier assigned thereto. The obtainment unit 40 obtains a response with regard to the attribute information of the access terminal 21 from the access terminal 21 in response to the request by the request unit 39. The change unit 41, based on the attribute information of the access terminal 21 obtained from the access terminal 21 by the obtainment unit 40, changes the information to permit transition into the semi connected state generated by the generation unit 38.

Figure 8:
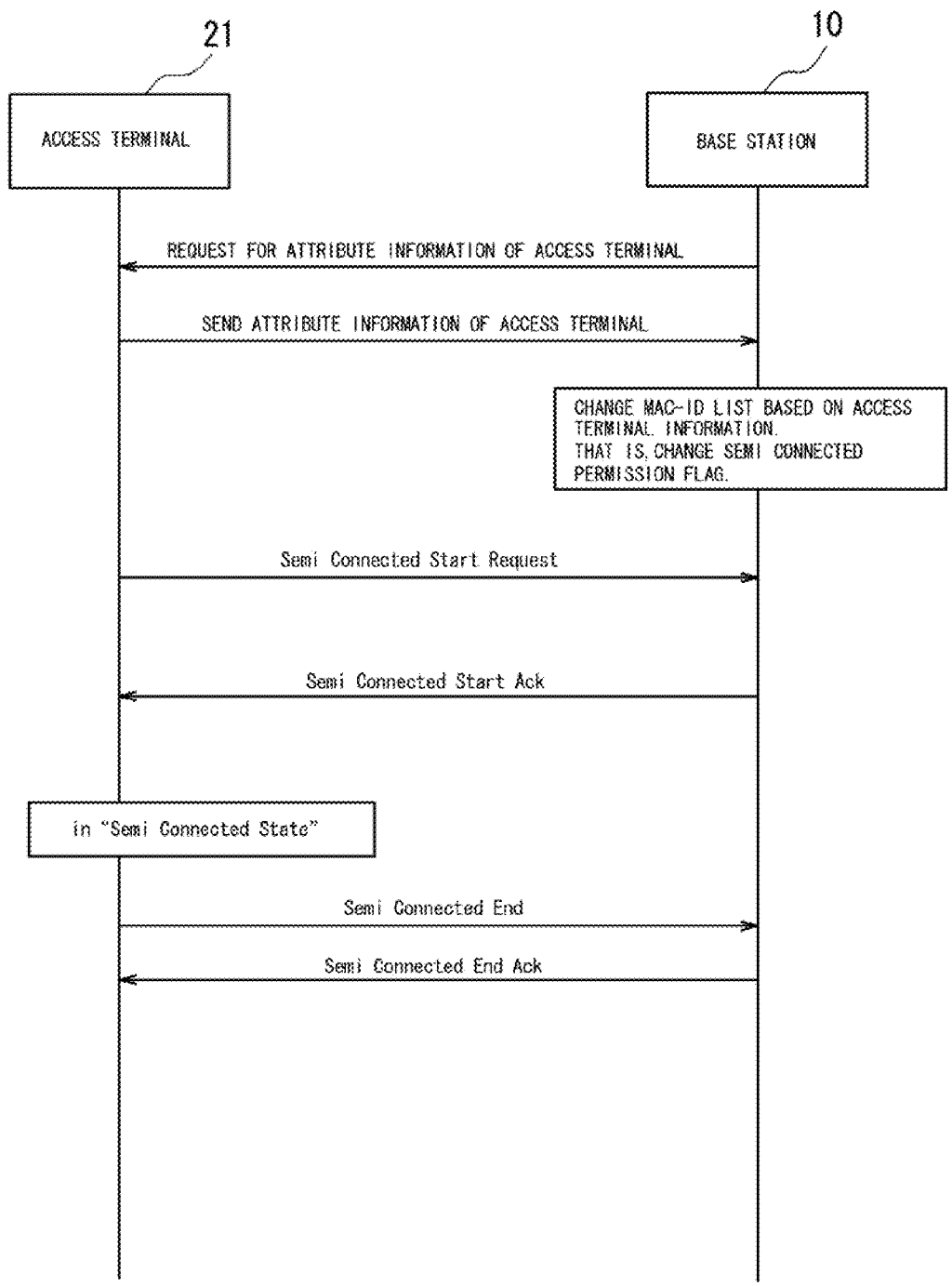
FIG. 8 is a sequence diagram illustrating exchanges of massages between the base station and the access terminal in accordance with the second embodiment.

FIG. 8 is a sequence diagram illustrating exchanges of massages between the base station and the access terminal in accordance with the second embodiment. As shown in FIG. 8, the base station 10 requests the attribute information of the access terminal 21 to the access terminal 21. In response to the request, the access terminal 21 sends the attribute information thereof. The base station 10, based on the attribute information of the access terminal 21, changes the information (Semi Connected Permit MAC-ID List) to permit the transition into the semi connected state, that is, changes the semi connected state permission flag.

For example, when the base station 10, based on the attribute information of the access terminal 21 to which an access terminal identifier with a semi connected state permission flag set to "0" (Unpermitted) is assigned, determines that it is necessary to have the access terminal 21 transit into the semi connected state preferentially, the base station 10 changes the semi connected state permission flag to "1" (Permitted). On the contrary, when the base station 10, based on the attribute information of the access terminal 21 to which an access terminal identifier with the semi connected state permission flag set to "1" (Permitted) is assigned, determines that it is not necessary to have the access terminal 21 transit into the semi connected state preferentially, the base station 10 changes the semi connected state permission flag to "0" (Unpermitted).

Subsequently, although not shown in FIG. 8, the base station 10 transmits the changed Semi Connected Permit MAC-ID List to the access terminal 21 as shown in FIG. 5. Then, based on the changed Semi Connected Permit MAC-ID List, the access terminal 21 checks a semi connected state permission flag corresponding to the access terminal identifier of its own. In a case where the semi connected state permission flag corresponding to the access terminal identifier of the access terminal 21 indicates "1" (Permitted) and the access terminal 21 needs to transit to the semi connected state, the access terminal 21 transmits a Semi Connected Start Request to the base station 10. When receiving the request, the base station 10 transmits a Semi Connected Start Ack, which is an acknowledgement response, to the access terminal 21. When receiving the acknowledgement response, the access terminal 21 transits into the semi connected state.

Then, in order to end the semi connected state, the access terminal 21 transmits the Semi Connected End to the base station 10. When receiving the Semi Connected End, the base station 10 transmits the Semi Connected End Ack, which is the acknowledgement response, to the access terminal 21.

The attribute information of the access terminal 21 (terminal) is information indicating an attribute of the access terminal 21, for example, information indicating that the access terminal 21 belongs to a particular group with high communication priority. As the group with high communication priority, there is a highly public group such as a police and a fire department, a member group prioritized under a certain condition, and the likes.

When the access terminal 21 is used in the particular group with high communication priority, it is also possible to add the access terminal identifier (MAC-ID) assigned to the access terminal 21 to the Semi Connected Permit MAC-ID List and set the semi connected state permission flag to "1" (Permitted) so that the access terminal 21 can use the semi connected state preferentially. That is, the change unit 41 changes the information to permit the transition into the semi connected state in accordance with priority of the access terminal 21.

As described above, since the base station 10 changes the information (Semi Connected Permit MAC-ID List) to permit the transition into the semi connected state based on the attribute information of the access terminal 21, it is possible to appropriately select MAC-ID to permit the semi connected state in accordance with priority of the access terminal 21 and permit the user in need of the semi connected state to transit into the semi connected state.

In addition, the access terminal 21 is prevented from uselessly transmitting the semi connected start request which is unlikely to be permitted, which enables to save a transmission resource on the reverse link. Moreover, it is also possible to effectively insert MAC-ID of the access terminal 21 in need of the semi connected state into the information (Semi Connected Permit MAC-ID List) to permit the transition into the semi connected state.

Third Embodiment

In accordance with a third embodiment, the base station 10 changes the information (Semi Connected Permit MAC-ID List) to permit the transition into the semi connected state so that the access terminal 21 presently using an application for which transition into the semi connected state is effective can become a target of the transition into the semi connected state.

Figure 9:
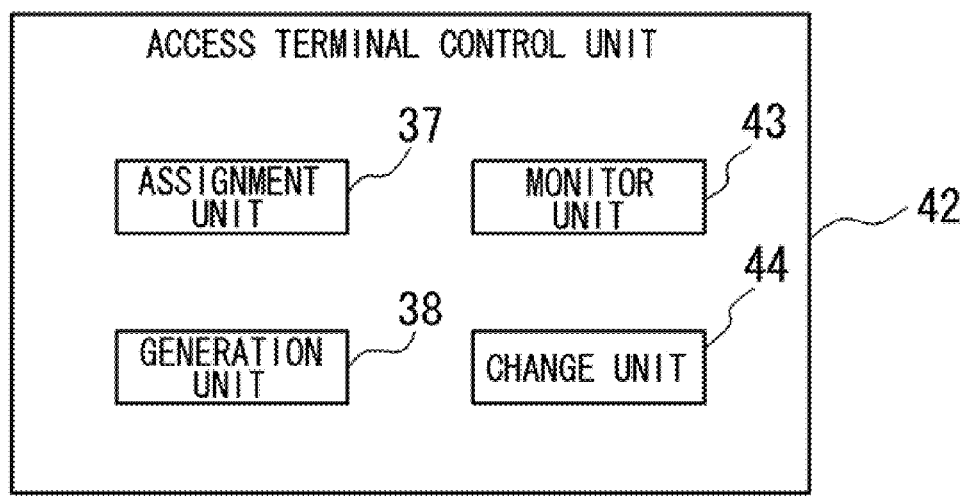
FIG. 9 is a block diagram illustrating a constitution of the access terminal control unit provided to the control unit in FIG. 1 in accordance with a third embodiment.

FIG. 9 is a block diagram illustrating a constitution of the access terminal control unit provided to the control unit in FIG. 1, in accordance with the third embodiment. In the control unit 16 of the base station 10, the protocol control unit 19, for example, is provided with an access terminal control unit 42 to control the access terminal 21 and, as shown in FIG. 9, the access terminal control unit 42 is provided with an assignment unit 37, a generation unit 38, a monitor unit 43 and a change unit 44. That is, the access terminal control unit 42 has the monitor unit 43 and the change unit 44 in place of the request unit 39, the obtainment unit 40 and the change unit 41 of the second embodiment. Other constitutions and operations of the access terminal control unit 42 are substantially the same as those of the access terminal control unit 36.

When there is an access terminal 21 using an application for which transition into the semi connected state is effective among access terminals 21 having access terminal identifiers (MAC-ID) assigned thereto, the monitor unit 43 monitors an operation period of the application by the access terminal 21.

When the access terminal 21 using the application for which transition into the semi connected state is effective for longer than a predetermined period is detected based on a result of monitor by the monitor unit 43, the change unit 44 determines whether the access terminal 21 detected is permitted to transit into the semi connected state. In a case where the access terminal 21 is not permitted to transit into the semi connected state, the change unit 44 changes the information (Semi Connected Permit MAC-ID List) to permit the transition into the semi connected state generated by the generation unit 38 so as to permit the access terminal 21 to transit into the semi connected state.

Figure 10:
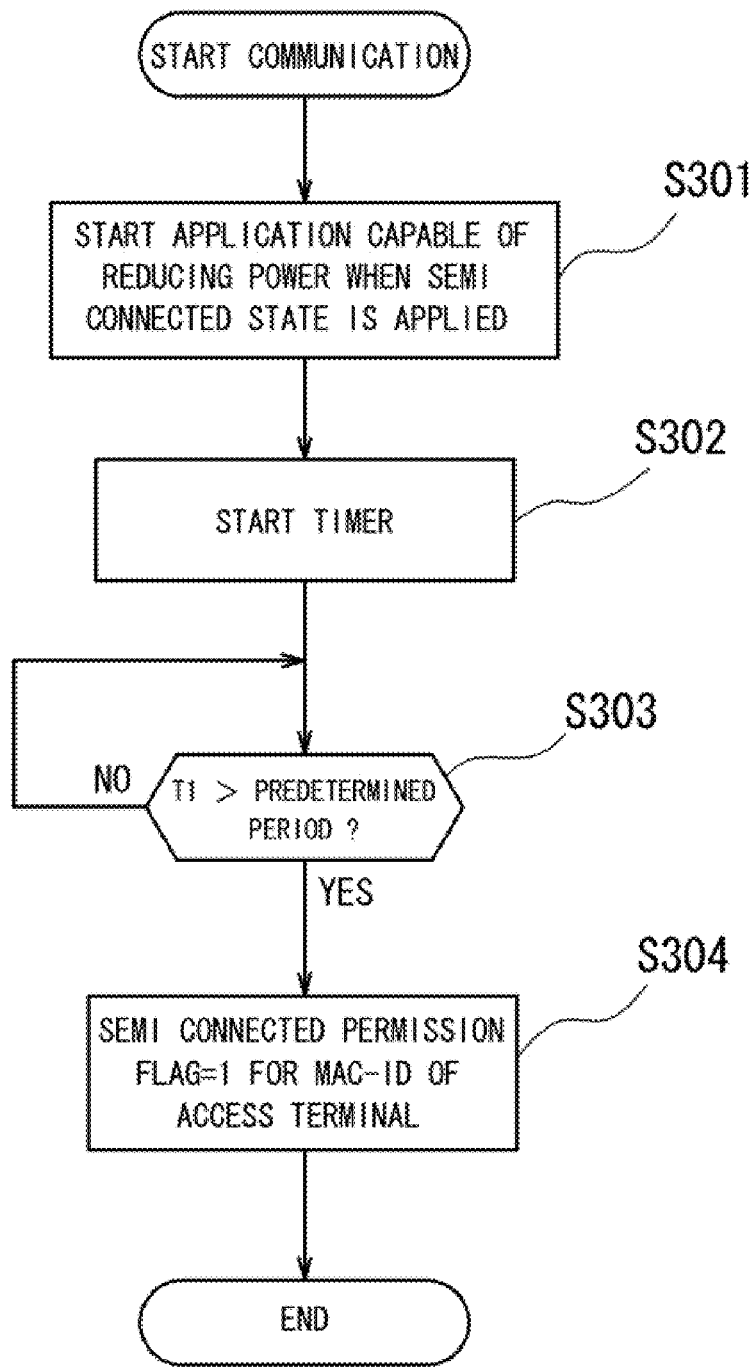
FIG. 10 is a flow chart of a process to change information to permit transition in accordance with the third embodiment.

FIG. 10 is a flow chart of a process to change the information to permit transition according to the third embodiment. As shown in FIG. 10, when a communication is started between the base station 10 and the access terminal 21, first, an application capable of reducing power by applying the semi connected state is started (step S301). Next, a timer is activated and starts measuring an elapsed time (step S302). This timer is reset by the end of the application capable of reducing power by applying the semi connected state.

Next, the base station 10 determines whether an elapsed time T1 measured is longer than the predetermined period (T1>the predetermined period) (step S303). In a case where the elapsed time T1 is not longer than the predetermined period (NO) as a result of a determination, the base station repeats determining. In a case where the elapsed time T1 is longer than the predetermined period (YES), the semi connected state permission flag of MAC-ID of the access terminal 21 is set (Semi Connected Permission Flag=1) (step S304). It is to be noted that when the access terminal 21 loses MAC-ID of the sector by hand-off and the likes, the semi connected state permission flag is not set (Semi Connected Permission Flag=0). Then, the process is ended.

It is to be noted that, as shown in FIG. 5, the changed information (Semi connected Permit MAC-ID List) to permit the transition into the semi connected state is transmitted from the base station 10 to the access terminal 21. Based on the changed information (Semi connected Permit MAC-ID List) to permit the transition into the semi connected state, the access terminal 21 checks the semi connected state permission flag corresponding to the access terminal identifier of its own. When the semi connected state permission flag corresponding to the access terminal identifier of its own indicates "1" (Permitted), the access terminal 21 transmits the semi connected start request to the base station 10.

Such applications in need of applying the semi connected state is mainly ones used for Push To Talk (PTT) and an effective means to carry out a dispatch operation in a cellular system. For example, the base station 10 may be configured to permit the access terminals 21 which start using the PTT application to transit into the semi connected state up to the number of access terminals 21 permissible in the base station 10. In order to permit the semi connected state, for example, the base station 10 may change the flag of MAC-ID of the access terminal 21 using an application in need of the semi connected state and used in PTT or the like for a predetermined period to be permitted or, may add the MAC-ID in the Semi Connected MAC-ID List as MAC-ID newly permitted to transit into the semi connected state by setting the semi connected state permission flag to "1" (Permitted).

As described above, the base station 10 changes the information (Semi Connected Permit MAC-ID List) to permit the transition into the semi connected state, so that the access terminal 21 using the application for which transition into the semi connected state is effective becomes a target of transition into the semi connected state. Thereby, the access terminal 21 highly in need of the semi connected state, of which resource and application are limited, that is, the access terminal 21 which uses the application using the semi connected state for the predetermined period is selected so that the user truly in need of the semi connected state is permitted to transit into the semi connected state.

In addition, the access terminal 21 is prevented from uselessly transmitting the semi connected start request which is unlikely to be permitted, which enables to save the transmission resource on the reverse link. Moreover, it is also possible to effectively insert MAC-ID of the access terminal 21 in need of the semi connected state into the information (Semi Connected Permit MAC-ID List) to permit the transition into the semi connected state.

That is, since having MAC-ID permitted to transit into the semi connected state already, the access terminal 21 can use it effectively. It is especially effective in a case using, for example, Push To Talk (PTT) where the access terminal 21 is mainly in the idle state and is desired a quick response from the idle state to calling.

Fourth Embodiment

In a fourth embodiment, the base station 10 changes the information (Semi Connected Permit MAC-ID List) to permit the transition into the semi connected state when there is a request from the access terminal 21, so that the access terminal 21 presently using an application for which transition into the semi connected state is effective becomes a target of the transition into the semi connected state.

Figure 11:
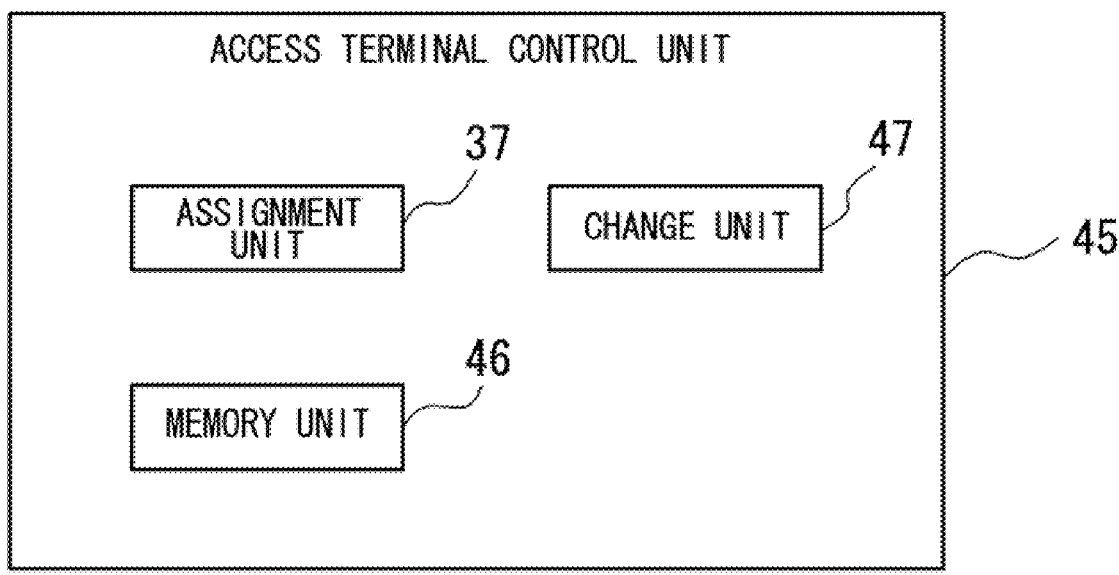
FIG. 11 is a block diagram illustrating a constitution of the access terminal control unit provided to the control unit in FIG. 1 in accordance with a fourth embodiment.

FIG. 11 is a block diagram illustrating a constitution of the access terminal control unit provided to the control unit in FIG. 1 in accordance with a fourth embodiment. In the control unit 16 of the base station 10, the protocol control unit 19, for example, is provided with an access terminal control unit 45 for controlling the access terminal 21. As shown in FIG. 11, the access terminal control unit 45 is provided with an assignment unit 37, a memory unit 46 and a change unit 47. That is, the access terminal control unit 45 has the memory unit 46 and the change unit 47 in place of the generation unit 38, the request unit 39, the obtainment unit 40 and the change unit 41. The other constitutions and operations of the access terminal control unit 45 are the same as those of the access terminal control unit 36.

The memory unit 46 stores the information (Semi Connected Permit MAC-ID List) to permit the transition into the semi connected state where the access terminal 21 saves power while holding the access terminal identifier (MAC-ID).

The change unit 47 identifies the access terminal 21 using an application for which transition into the semi connected state is effective among the access terminals 21 having the access terminal identifiers (MAC-ID) assigned thereto, and then determines whether the access terminal 21 identified is permitted to transit into the semi connected state. In a case where this access terminal 21 is not permitted to transit into the semi connected state, the change unit 47 changes the access terminal identifier assigned to the access terminal 21 to an access terminal identifier permitted to transit into the semi connected state based on the information stored in the memory unit 46.

Figure 12:
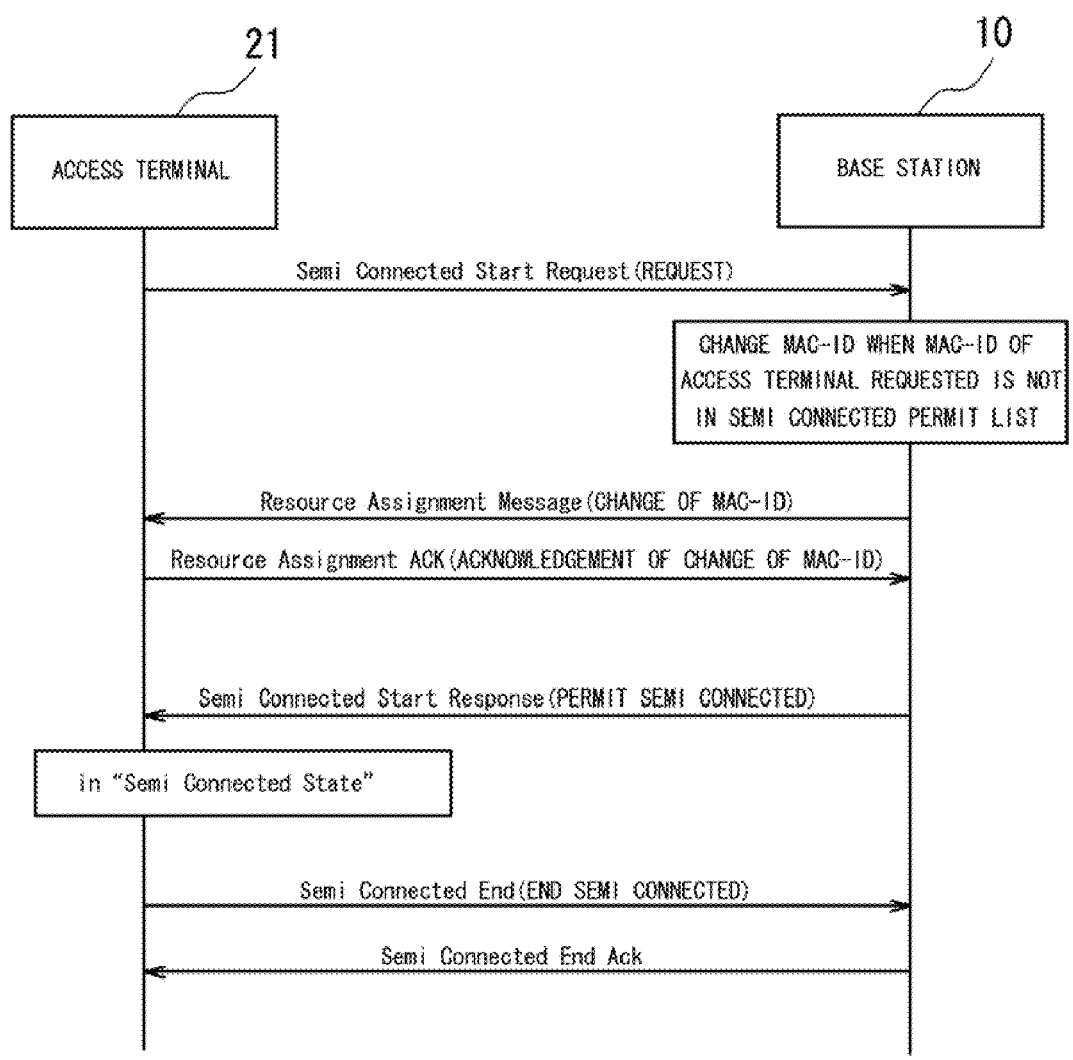
FIG. 12 is a sequence diagram illustrating exchanges of massages between the base station and the access terminal in accordance with the fourth embodiment.

FIG. 12 is a sequence diagram illustrating exchanges of massages between the base station and the access terminal in accordance with the fourth embodiment. As shown in FIG. 12, the access terminal 21 transmits a Semi Connected Start Request to transit into the semi connected state to the base station 10. At this time, along with the request, the access terminal 21 informs that the access terminal 21 is presently using an application, for example, Push To Talk (PTT), for which transition into the semi connected state is effective. That is, the base station 10 detects at that time that the access terminal 21 is using the application for which transition into the semi connected state is effective.

When receiving the Semi Connected Start Request, the base station 10 changes MAC-ID if the MAC-ID of the access terminal 21 which transmitted the request is not in the information (Semi Connected Permit MAC-ID List) to permit the transition into the semi connected state. Then, the base station 10 transmits a Resource Assignment Message, which is a change of MAC-ID, to the access terminal 21.

When receiving the Resource Assignment Message, the access terminal 21 transmits a Resource Assignment Ack, which is an acknowledgement of the change of the MAC-ID, to the base station 10. When receiving the Resource Assignment Ack, the base station 10 transmits a Semi Connected Start Response as a response to transit into the semi connected state, that is, semi connected permission to the access terminal 21. When receiving the response to transit into the semi connected state, the access terminal 21 transits into the semi connected state.

Then, the access terminal 21 transmits a Semi Connected End to the base station 10. When receiving the Semi Connected End from the access terminal 21, the base station 10 transmits a Semi Connected End Ack to the access terminal 21. When receiving the Semi Connected End Ack, the access terminal 21 leaves the semi connected state.

As described above, in a case where the access terminal 21 using an application for which transition into the semi connected state is effective is not permitted to transit into the semi connected state since it is not included in the information (Semi Connected Permit MAC-ID List) to permit the transition into the semi connected state, the base station 10 changes the information (Semi Connected Permit MAC-ID List) when there is a request (notification of an application which uses the semi connected state) from the access terminal 21 to be a target of transition into the semi connected state.

Thereby, when the access terminal 21, not permitted to transit into the semi connected state, that is, having MAC-ID not to be permitted to transit into the semi connected state assigned thereto, actually uses the application which uses the semi connected state, the base station 10 assigns MAC-ID permitted to transit into the semi connected state to the access terminal 21 and accepts the access terminal 21 in a state permitted to transit into the semi connected state, or permits MAC-ID assigned to the access terminal 21 to transit into the semi connected state.

Accordingly, the base station 10 can permit the user truly in need of the semi connected state to transit into the semi connected state. In addition, the access terminal 21 is prevented from uselessly transmitting the semi connected start request which is unlikely to be permitted, which enables to save the transmission resource on the reverse link. Moreover, it is also possible to effectively insert MAC-ID of the access terminal 21 in need of the semi connected state into the information (Semi Connected Permit MAC-ID List) to permit the transition into the semi connected state.

Fifth Embodiment

In accordance with a fifth embodiment, the base station 10 randomly creates the information (Semi Connected Permit MAC-ID List) to permit the access terminal 21 to transit into the semi connected state. More specifically, the base station 10 randomly generates access terminal assignment numbers (see FIG. 6), which are in a fixed range predetermined, for the base station 10 to permit the access terminal 21 to transit into the semi connected state, and transmits a random MAC-ID list of less or equal to a certain number of MAC-IDs. Other constitutions and operations of the base station 10 are the same as those of the base station 10 in accordance with the second embodiment.

FIG. 13 is a table exemplifying correspondence of the access terminal identifiers and the semi connected state permission flags in accordance with a fifth embodiment. Here it shows an example of the list permitting the semi connected state. In FIG. 13, when N MAC-ID=1024, f(x)=1 or 0, x=0 to 1023, a total number of 1 is less or equal to N Semi Connected Permit RND=a random number from 0 to 1

IF RND<(N Semi Connected Permit)/(N MAC-ID) then f(x)=1 else f(x)=1

Although the present invention has been described with reference to embodiments described above, it is to be noted that the present invention is not limited to the embodiments and therefore covers modified embodiments not departing from the spirit of the present invention. For example, the present invention also covers appropriate combinations of each embodiment (first to fifth embodiments) described above.

The invention claimed is:

1. A control method of a base station comprising:
   an assignment step for assigning an access terminal identifier to an access terminal of the base station so as to identify access terminals that the base station controls;
   a storage step for storing information to permit transition into a semi connected state where an access terminal saves power, while the access terminal holds an access terminal identifier; and
   a change step, in a case where an access terminal among the access terminals having the access terminal identifiers assigned thereto is using an application for which transition into the semi connected state is effective and an access terminal identifier assigned to the access terminal is not permitted to transit into the semi connected state, for changing the access terminal identifier assigned to the access terminal to an access terminal identifier permitted to transit into the semi connected state based on the information stored.

2. A control method of a base station comprising:
   an assignment step for assigning an access terminal identifier to an access terminal of the base station so as to identify access terminals that the base station controls;
   a generation step for generating information to permit transition into a semi connected state where an access terminal saves power, while the access terminal holds an access terminal identifier;
   a transmission step for transmitting the information to permit the transition into the semi connected state generated to the access terminal;
   a monitor step for monitoring an operation period of an application being used by an access terminal among the access terminals having the access terminal identifiers assigned thereto, wherein transition into the semi connected state is effective for the application; and
   a change step, in a case where the application is used by the access terminal for a predetermined period or longer based on a result of a monitor and an access terminal identifier assigned to the access terminal is not permitted to transit into the semi connected state, for changing the information generated so as to permit the access terminal to transit into the semi connected state.

3. A control method of a base station comprising:
   an assignment step for assigning an access terminal identifier to an access terminal of the base station so as to identify access terminals that the base station controls;
   a generation step for generating information to permit transition into a semi connected state where an access terminal saves power, while the access terminal holds an access terminal identifier;
   a transmission step for transmitting the information to permit the transition into the semi connected state generated to the access terminal;
   a request step for requesting attribute information of the access terminal to the access terminal having the access terminal identifier assigned thereto,
   an obtainment step for obtaining a response with regard to the attribute information of the access terminal from the access terminal in response to the request; and
   a change step, based on the attribute information of the access terminal obtained front the access terminal in the obtainment step, for changing the information to permit the transition into the semi connected state generated.

* * * * *